US012317034B2

(12) United States Patent
Liang

(10) Patent No.: US 12,317,034 B2
(45) Date of Patent: May 27, 2025

(54) AIR-PULSE GENERATING DEVICE WITH TOOTH EDGE PATTERNED SLIT

(71) Applicant: xMEMS Labs, Inc., Santa Clara, CA (US)

(72) Inventor: Jemm Yue Liang, Sunnyvale, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/829,245

(22) Filed: Sep. 9, 2024

(65) Prior Publication Data

US 2025/0106565 A1 Mar. 27, 2025

Related U.S. Application Data

(60) Provisional application No. 63/540,648, filed on Sep. 26, 2023, provisional application No. 63/539,803, filed on Sep. 21, 2023.

(51) Int. Cl.
*H04R 17/00* (2006.01)
*H04R 7/06* (2006.01)
*H04R 19/02* (2006.01)

(52) U.S. Cl.
CPC ............... *H04R 17/00* (2013.01); *H04R 7/06* (2013.01); *H04R 19/02* (2013.01); *H04R 2217/03* (2013.01)

(58) Field of Classification Search
CPC .......... H04R 17/00; H04R 7/06; H04R 19/02; H04R 2217/03
See application file for complete search history.

(56) References Cited

U.S. PATENT DOCUMENTS 4,364,147 A * 12/1982 Biedermann ........... B08B 5/023 15/316.1
9,516,421 B1 * 12/2016 Loeppert ................ H04R 17/02
9,736,595 B2 * 8/2017 Elyada ................... G10K 15/04
10,284,960 B2 * 5/2019 Grosh ...................... H04R 7/06
10,771,893 B1 * 9/2020 Liang ..................... G10K 15/02
2003/0017012 A1 * 1/2003 Onoe .................... F16K 31/084 406/108
2004/0024455 A1 * 2/2004 de Vries .................. A61F 2/203 623/9
2012/0018244 A1 * 1/2012 Robert .................. B06B 1/0292 181/142
2012/0053393 A1 * 3/2012 Kaltenbacher ....... H04R 25/606 29/25.35
2014/0084396 A1 * 3/2014 Jenkins ................ H04R 23/006 257/419
2014/0341394 A1 * 11/2014 Croft, III ................ H04R 3/04 381/102
2017/0021391 A1 * 1/2017 Guedes ................. B06B 1/0603
(Continued)

*Primary Examiner* — Oyesola C Ojo
(74) *Attorney, Agent, or Firm* — Winston Hsu

(57) ABSTRACT

An air-pulse generating device includes a film structure including a first flap and a second flap opposite to each other. The film structure is actuated to operate at an ultrasonic frequency, and the air-pulse generating device produces a plurality of air pulses at an ultrasonic pulse rate. The first flap and the second flap are actuated to perform a differential movement to form an opening or a virtual valve. A slit is formed between the first flap and the second flap, and the opening or the virtual valve is formed because of the slit. The slit is formed as a zigzagging pattern on the film structure.

25 Claims, 15 Drawing Sheets

(56) References Cited

U.S. PATENT DOCUMENTS

| | | | | |
|---|---|---|---|---|
| 2017/0041708 | A1* | 2/2017 | Barzen | G10K 15/04 |
| 2018/0098139 | A1* | 4/2018 | Arevalo Carreno | H04R 31/006 |
| 2019/0313189 | A1* | 10/2019 | Liang | H04R 3/04 |
| 2020/0087138 | A1* | 3/2020 | Schenk | H04R 19/005 |
| 2022/0224999 | A1 | 7/2022 | Liang | |
| 2022/0225032 | A1* | 7/2022 | Liang | H04R 19/02 |
| 2023/0292058 | A1 | 9/2023 | Liang | |

* cited by examiner 200
101
212
103
Z
X
Y
A
A'

200
101
212
$D_T$
103
Z
X
Y
B
B'

200
$d_{AA}$
101
103
231
$W_T$
$D_T$
212
232
B
B'
A
A'
D
D'
Y
X
Z
$X_{101L}$
$X_{103L}$
$X_{101R}$
$X_{103R}$
101
103
102
10

200
101
$P_A$
103
Z
X
Y
D
D'
$P_B$

AIR-PULSE GENERATING DEVICE WITH TOOTH EDGE PATTERNED SLIT

CROSS REFERENCE TO RELATED APPLICATIONS

This application claims the benefit of U.S. Provisional Application No. 63/540,648, filed on Sep. 26, 2023. Further, this application claims the benefit of U.S. Provisional Application No. 63/539,803, filed on Sep. 21, 2023. The contents of these applications are incorporated herein by reference.

BACKGROUND OF THE INVENTION

1. Field of the Invention

The present invention relates to an air-pulse generating device, and more particularly, to an air-pulse generating device capable of producing asymmetric air pressure pulses.

2. Description of the Prior Art

Conventionally, speaker driver and back enclosure are two major design challenges in the speaker industry. It is difficult for one single conventional speaker (such as dynamic driver) to cover an entire audio frequency band, e.g., from 20 Hz to 20 KHz. To produce high fidelity sound with high enough sound pressure level (SPL), both the radiating/moving surface and volume/size of back enclosure for the conventional speaker are required to be sufficiently large.

U.S. Pat. Nos. 9,736,595 and 10,367,430 have discussed ultrasonic pulse for sound producing application. Moreover, Applicant discloses APG (APG: air-pulse generating) device or APPS (APPS: air pressure pulse speaker) in U.S. Pat. Nos. 10,425,732, 11,172,310, 10,425,732, 11,043,197 and 11,445,279, to resolve the above bandwidth and size issues.

However, performance of APPS relies on asymmetry of the air pressure pulses produced by the APG device.

SUMMARY OF THE INVENTION

It is therefore a primary objective of the present application to provide an APG device capable of producing asymmetric air pressure pulses, to improve over disadvantages of the prior art.

An embodiment of the present disclosure provides an air-pulse generating device, comprising a film structure, comprising a first flap and a second flap opposite to each other; wherein the film structure is actuated to operate at an ultrasonic frequency, and the air-pulse generating device produces a plurality of air pulses at an ultrasonic pulse rate; wherein the first flap and the second flap are actuated to perform a differential movement to form an opening or a virtual valve; wherein a slit is formed between the first flap and the second flap, and the opening or the virtual valve is formed because of the slit; wherein the slit is formed as a zigzagging pattern on the film structure.

These and other objectives of the present invention will no doubt become obvious to those of ordinary skill in the art after reading the following detailed description of the preferred embodiment that is illustrated in the various figures and drawings.

DETAILED DESCRIPTION

Content of U.S. Pat. No. 11,943,585 B2 and application Ser. No. 18/624,105 is incorporated herein by reference.

Air-pulse generating device in the present application generally comprises a pair of opposite flaps, fabricated by etching a membrane layer made of, e.g., SOI (SOI: silicon on insulator), POI (POLY on insulator) or other suitable material. By adding a layer of piezoelectric material, such as PZT, deposited atop the pair of flaps, the pair of opposing flaps are actuated to move up & down, to produce both a common mode motion and a differential mode motion, performing the function of modulation and demodulation, respectively.

Figure 1:
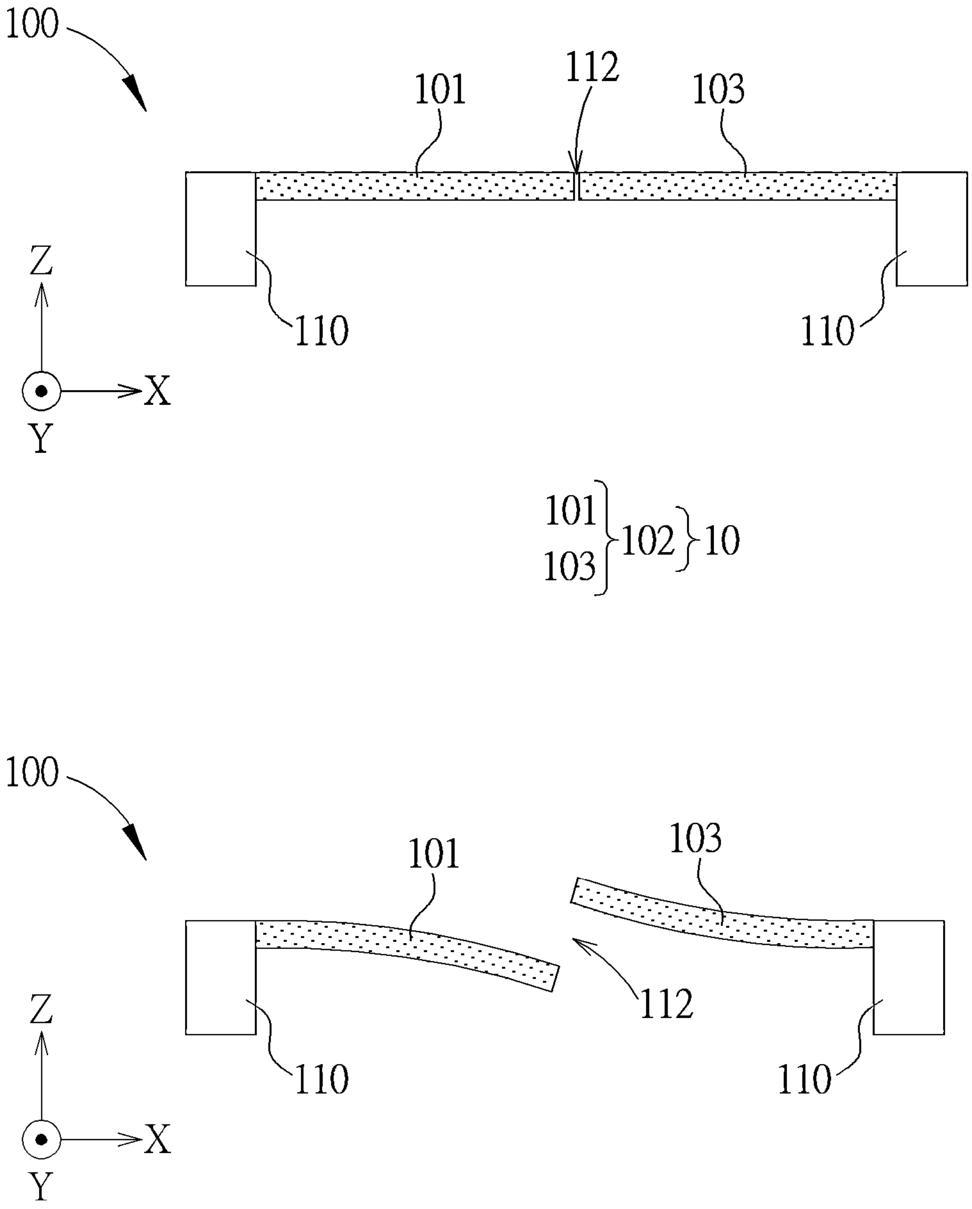
FIG. 1 is a cross-sectional view of an air-pulse generating (APG) device.

Specifically, FIG. 1 is cross-sectional view of an air-pulse generating (APG) device 100. The APG device comprises a film structure (e.g., membrane or diaphragm) 10. The film structure 10 comprises flaps 101 and 103 opposite to each other. Operation principle of the APG device 100 is similar to the one disclosed in U.S. Pat. No. 11,943,585 B2. The flaps 101 and 103 (forming as a flap pair 102) are actuated to perform a common mode movement to form an amplitude-modulated ultrasonic air pressure variation with an ultrasonic frequency (e.g., 192 KHz), which can be regarded as a modulation operation. Meanwhile, the flaps 101 and 103 are also actuated to perform a differential mode movement to form an opening 112 or a virtual valve (abbreviated as VV) 112, at an ultrasonic opening rate (e.g., 192 KHz), so as to perform a demodulation operation.

Figure 2:
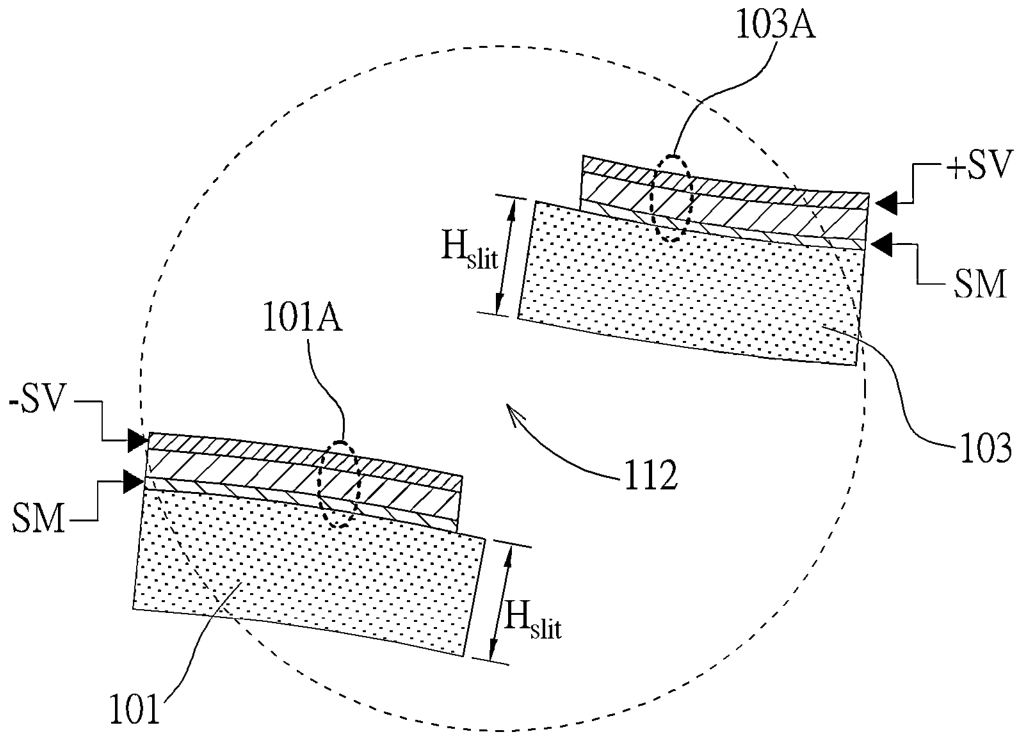
FIG. 2 illustrates a wiring scheme of an APG device.

In the embodiment shown in the APG device 100, the differential movement (demodulation) and the common mode movement (modulation) are simultaneously performed by the flap pair 102. The in situ and concurrent modulation-and-demodulation can be done by particular wiring scheme. For example, as shown in FIG. 2, the APG device 100 may comprise an actuator 101A disposed on the flap 101 and an actuator 103A disposed on the flap 103. The actuators 101A and 103A comprises top electrodes and bottom electrodes. In an embodiment, the bottom electrodes of the actuators 101A and 103A receives a common modulation signal SM, and the top electrodes of the actuators 101A and 103A receives differential demodulation signals +SV and −SV, where the demodulation signals +SV and −SV have opposite polarities. Note that, the wiring scheme shown in FIG. 2 is for illustrative purpose, which is not limited thereto. As long as one electrode of the actuator 101A/103A receives the modulation signal SM and another electrode receives the demodulation signal SV (representing either +SV or −SV), requirements of the present invention are satisfied, which is within the scope of the present application.

Figure 3:
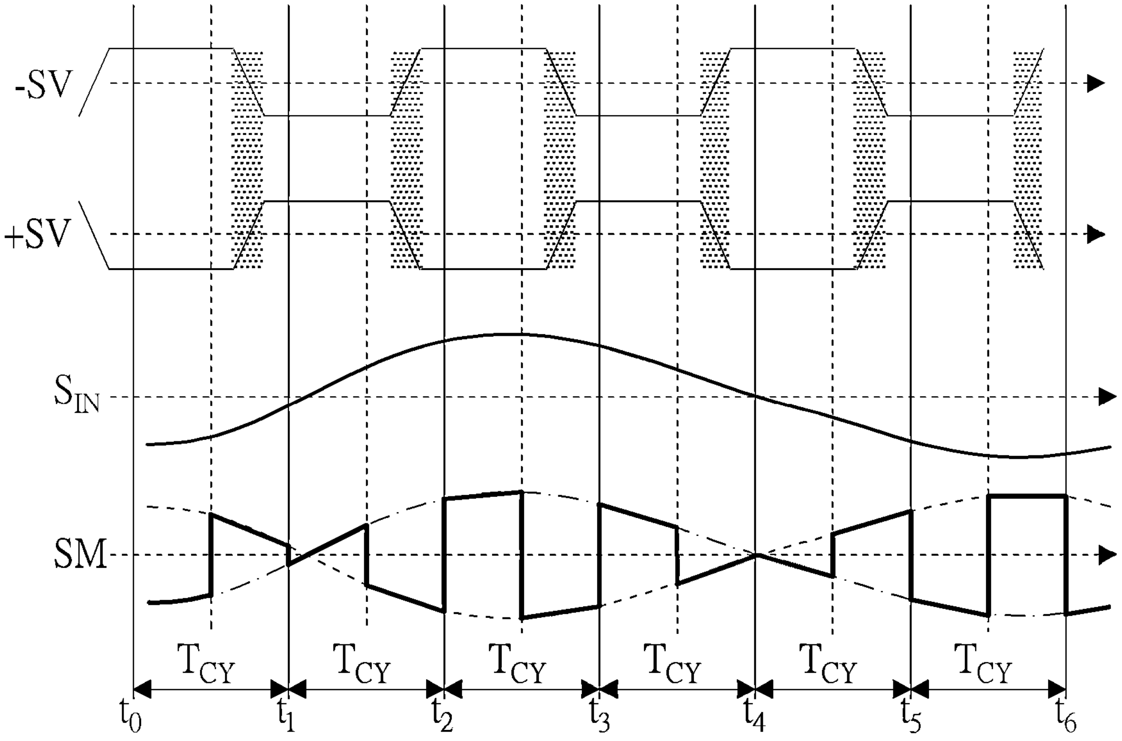
FIG. 3 illustrates a modulation signal and demodulation signals.

Waveforms of the modulation signal SM and the demodulation signal ±SV may be referred to FIG. 3 (or similar to which is shown in FIG. 3). Note that, a demodulation frequency of the demodulation signal SV is a half of a modulation frequency of the modulation signal SM. For example, when the modulation signal SM has the modulation frequency as 192 KHz, the demodulation signal SV would have the demodulation frequency as 96 KHz. Hence, the flaps 101 and 103 form the opening 112 at an opening rate of 192 KHz, and the APG device 100 produces a plurality of air pulses at an ultrasonic pulse rate $f_{Pulse}$ of 192 KHz.

In the present application, "the flaps 101 and 103 performing the common mode movement" means that the flaps 101 and 103 are actuated to move toward a common direction or actuated by a common driving signal, and "the flaps 101 and 103 performing the differential mode movement" means that the flaps 101 and 103 are actuated to move/bend toward different/opposite directions with respect to a common position or actuated by a differential pair of signals.

A slit 112 is formed between the flaps 101 and 103. In the present application, "slit", "opening" and "virtual valve" share the same notation (e.g., 112) as they share the same location and express similar concept in different aspect. By driving the flaps 101 and 103 via the demodulation signal ±SV, distance between free ends of the flaps 101 and 103 is enlarged and the opening 112 or the VV 112 is formed. Upper portion of FIG. 1 illustrates a snapshot of the VV 112 is closed/sealed, and lower portion of FIG. 1 illustrates a snapshot of the VV 112 is opened.

Figure 4A:
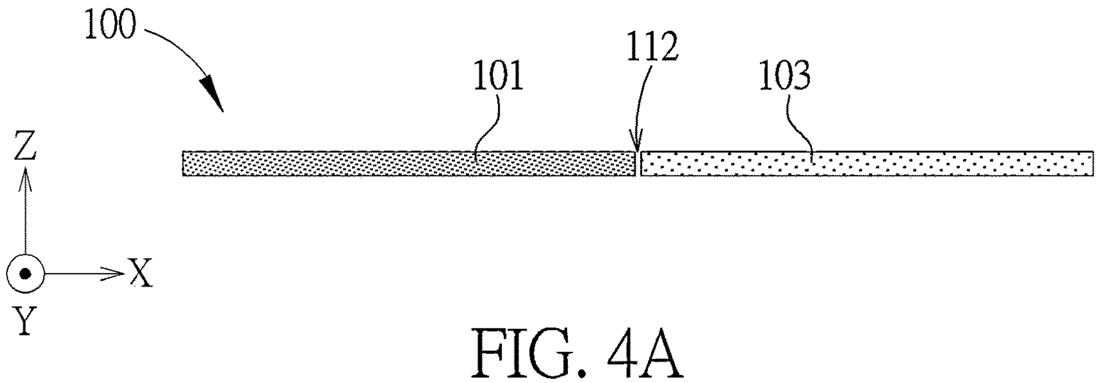
FIG. 4A illustrates a cross-sectional view of an APG device.
Figure 4B:
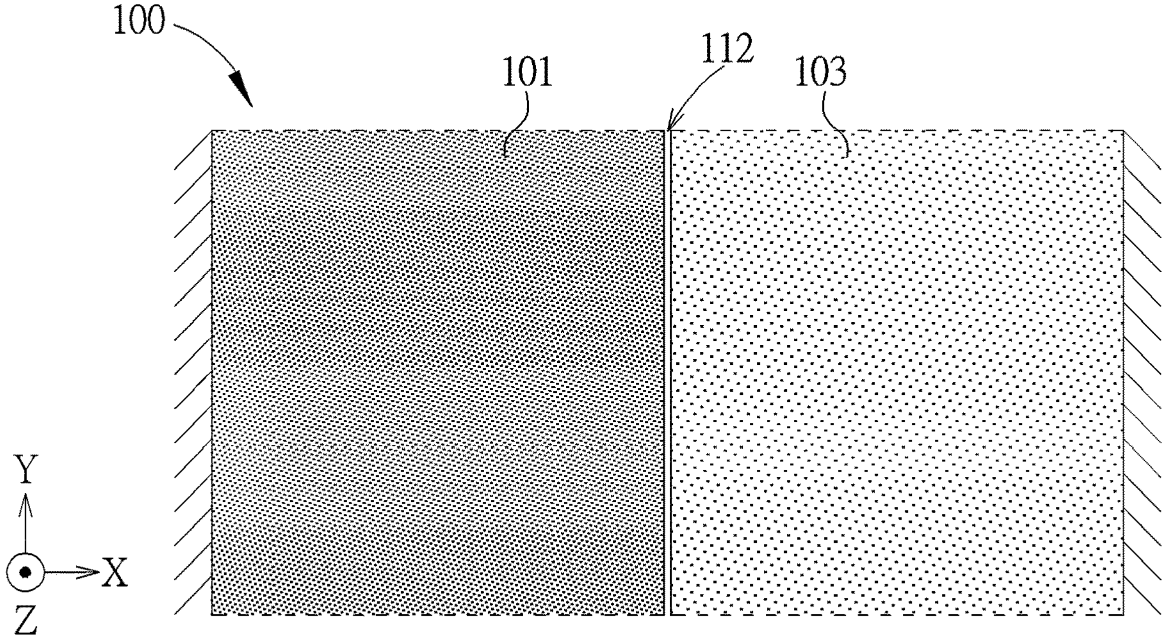
FIG. 4B illustrates a top view of the APG device of FIG. 4A.
Figure 4C:
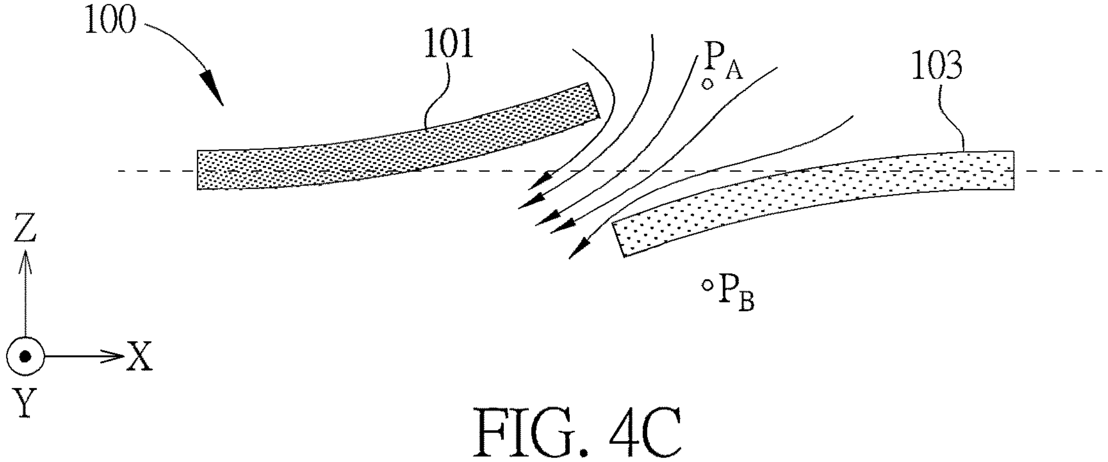
FIG. 4C illustrates airflow directions when a virtual valve (VV) of the APG device of FIG. 4B is opened.

Pattern of the slit 112 on/over the film structure 10 is not limited. Intuitively, the slit 112 may have straight-line slit pattern. FIGS. 4A-4C illustrates schematic diagrams for APG device with straight-line slit pattern. As shown in FIG. 4B, the slit 112 with straight-line slit pattern may be regarded as comprising zero projection onto X direction/dimension. APG device with straight-line slit pattern is successful in producing asymmetric airflow pulse. However, asymmetry of air pressure pulse produced by the APG device with straight-line slit pattern is not such obvious, or even may not be measurable. This is because of severe airflow congestion around the VV 112 and airflow detouring before reaching the VV 112, as shown FIG. 4C, where FIG. 4C schematically illustrates airflow vectors around the VV 112. In some figures of the present application, different types of shade are employed to illustrate flaps 101 versus 103, which does not mean flap 101 and 103 are made of different material.

Airflow congestion (when the VV 112 is (just) "opened") would increase a pressure difference ΔP surrounding the VV 112, where $\Delta P = P_A - P_B$ and $P_A/P_B$ represents air pressure right above/below the plane defined by the flap 101/103. Ideally, the pressure difference ΔP should be neutralized as soon/fast as possible when VV is opened. However, neutralization of pressure difference ΔP corresponding to slit with straight-line pattern is not fast enough. It is because airflow lateral components and airflow detouring.

As shown in FIG. 4, the airflow vectors comprise strong lateral components (components other than Z direction, in the straight-line slit pattern shown in FIG. 4B, lateral components represent components parallel to X direction), which means the airflow detours. Airflow detouring not only lengthens the airflow passageway, but also slows down the reaction of pressure balance across the two sides of the flaps 101, 103. After reaching the vicinity of VV112, the air will be queued up, waiting in turn to be squeezed through the narrow opening of VV112. All these steps/factors lead to their respective low-pass-filter (LPF) effect. Combined those factors, a strong high order LPF is created, which filters away the higher harmonics of $f_{Pulse}$. Since strong asymmetry waveform implies strong spectral components at high harmonics, such removal of harmonics of $f_{Pulse}$ implies loose of asymmetry.

Asymmetry of air pressure pulse is critical for the performance of the APG device, for both sound producing applications (which can be regarded as AC (AC: alternating current) airflow) and air movement applications (which can be regarded as DC (DC: direct current) airflow). It is desirable to propose a further new APG design owning asymmetry of air pressure pulse.

Several guidelines are introduced below. In order to avoid airflow congestion, the VV should be designed to span a significant amount on/over the X direction/dimension (or at least comprise nonzero projection onto X direction/dimension). In other words, the VV should span a significant percentage (or occupy a significant area) of a total area of the flaps 101, 103. For example, the VV 112 may span/occupy 20~40% (or at least 15%) of a total area of the flaps 101, 103, but not limited thereto.

In addition, in order to minimize lateral component when the VV is "opened", an acoustic impedance of the VV should be distributed in X direction in a mostly even manner, such that the air would flow straight through the VV (mostly through the Z direction). An amplitude of a combined common mode displacement $U_{Z.COM}(x)$ is suggested to be distributed in X direction in a mostly even manner. $U_{Z.COM}(x)$ is a combination/aggregation of common mode displacement of the flaps 101 and 103. For example, $U_{Z.COM}(x)$ may be expressed as $U_{Z.COM}(x)=(w_{101}(x)\cdot\Delta U_{z,101}(x)+w_{103}(x)\cdot\Delta U_{z,103}(x))/(w_{101}(x)+w_{103}(x))$, where $\Delta U_{z,101}(x)/\Delta U_{z,103}$ (x) represents individual common mode displacement of the flap 101/103 (corresponding to X dimension variable x), $w_{101}(x)/w_{103}(x)$ represents corresponding weighting factor. In an embodiment, $w_{101}(x)=w_{103}(x)=0.5$, but not limited thereto.

For avoiding airflow congestion and minimizing lateral component, one solution is to pattern/form the slit in a zigzagging pattern on the film structure. In the present application, slit with zigzagging pattern may refer that: 1) the slit is not straight-line; 2) the slit alters/changes its direction in a back-and-forth manner; or 3) the slit has nonzero projection onto X direction/dimension in a top view perspective, given the slit is patterned to zigzag in a back-and-forth manner among X direction and extends toward Y direction. A projection of the zigzagging patterned slit onto X direction/dimension may have a length/depth which is a significant percentage (e.g., more than 15%) of an anchor-to-anchor distance of the flaps 101 and 103 or the APG device.

Figures 5A, 5B, 5C, 5D:
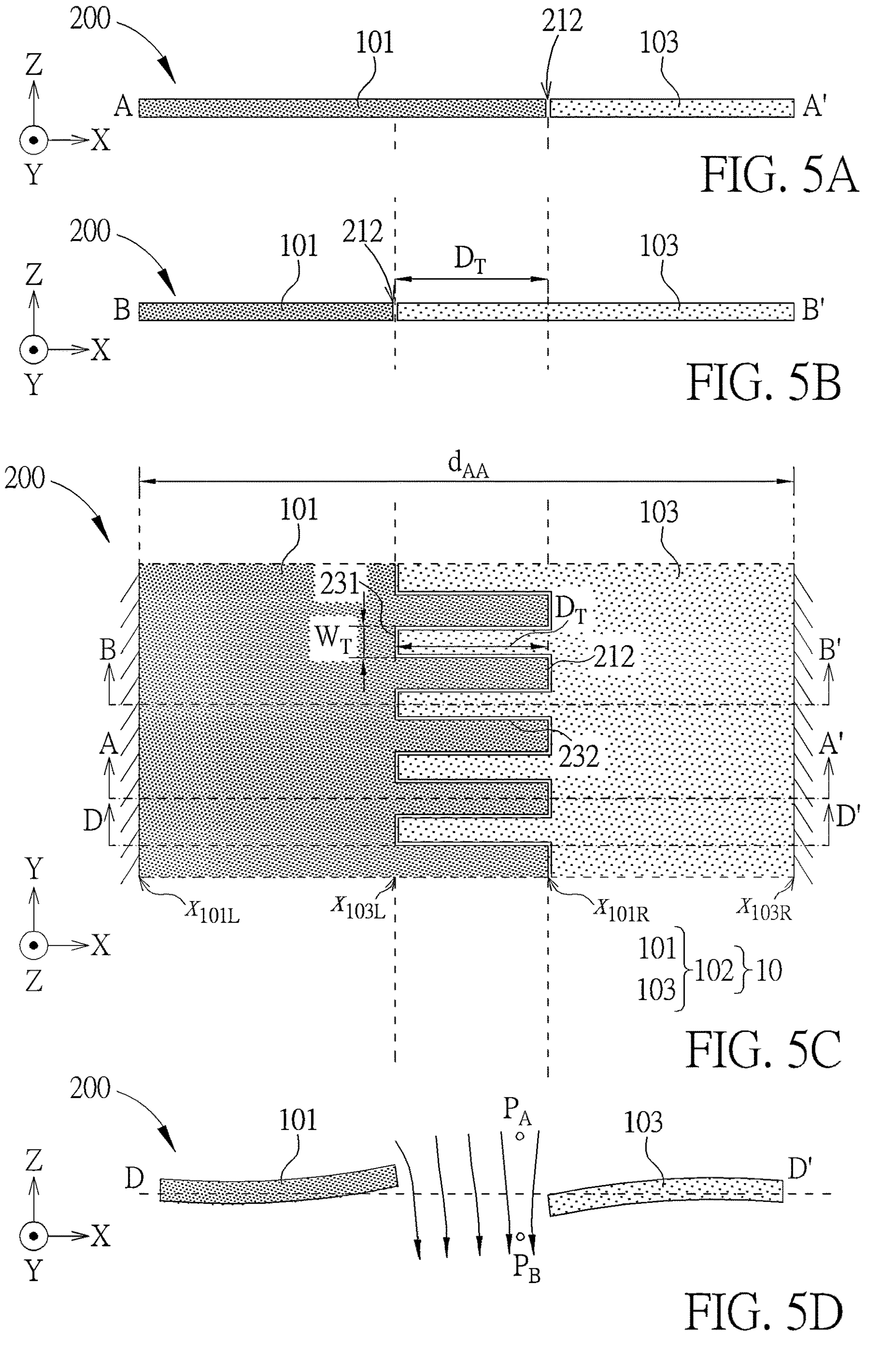
FIG. 5A and FIG. 5B illustrates cross-sectional view of an APG device according to an embodiment of the present application.
FIG. 5C illustrates a top view of the APG device of FIG. 5A and FIG. 5B.
FIG. 5D illustrates airflow directions when a virtual valve (VV) of the APG device of FIG. 5C is opened.

Please refer to FIGS. 5A-5D, which illustrate an APG device 200 according to an embodiment of the present invention, where FIG. 5C illustrates (a portion of) a zigzagging pattern of a slit 212 in a top view perspective, FIGS. 5A and 5B illustrate cross-sectional view along lines A-A' and B-B' when the flaps 101 and 103 are sustained flat (or the VV 212 is closed), FIG. 5D schematically illustrates airflow vectors when the VV 212 with the zigzagging pattern is opened, along a D-D' line in FIG. 5C.

Width (dimension/size in Y direction) of the APG device 200 is not limited to which is shown in FIG. 5C. The APG device 200 may comprise wide cantilevers, meaning width of the APG device 200 may be larger than several times of length (dimension/size in X direction) of the APG device 200. Or, in an embodiment, the flaps 101 and 103 may extend toward Y direction and have a relative extreme aspect ratio (e.g., greater than 2 or less than ½), which is not limited thereto.

Figure 6:
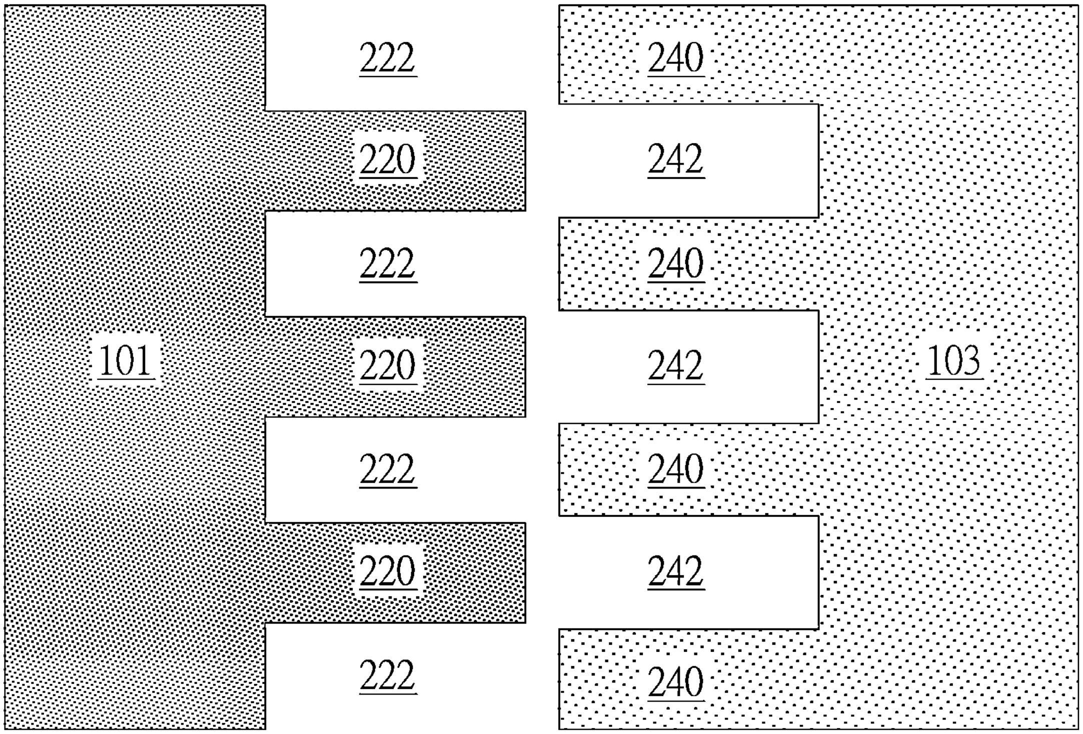
FIG. 6 illustrates a first flap and a second flap of the APG device of FIG. 5C which are separated apart.

The slit 212 may have a tooth edge pattern. Specifically, FIG. 6 illustrates the flap 101 separated way apart from the flap 103 with tooth patterned edge. As shown in FIG. 6, the flap 101/103 comprises protruded parts (protrusions) 220/240 and depressed parts (depressions) 222/242. The protrusions 220 and the depressions 240 are interleaved with each other. When the flaps 101 and 103 only separated by the slit 212 (see FIG. 5C and FIG. 6), the depressions 242 of the flap 103 accommodate the protrusions 220 of the flap 101, and vice versa, such that the protrusions 220 of the flap 101 and the protrusions 240 of the flap 103 are interleaved with each other. Furthermore, in FIG. 5C, the slit 212 has a rectangular tooth edge pattern, as an example.

From FIG. 5C, the slit 212 is not straight-line, alters/changes its direction in a back-and-forth manner. The slit 212 may be regarded as zigzagging in a back-and-forth manner among/over X direction between $x_{103L}$ and $x_{101R}$, and extending toward Y direction. Tooth depth $D_T$, a distance between $x_{103L}$ and $x_{101R}$ (shown in FIG. 5C), may be a certain percentage (e.g., more than 15% or 20~40%) of an anchor-to-anchor distance $d_{AA}$ between $x_{101L}$ and $x_{103R}$, where the flaps 101 and 103 of the APG device 200 is supposed to be anchored on the anchor structure like the APG device 100 is, but the anchor structure is omitted in FIG. 5 for brevity.

In addition, depressed parts 222 of the flap 101 (or protruded part 240 of the flap 103, neglecting slit width) may have a width $W_T$, which also denotes a length of a segment 231. In FIG. 5C, $W_T$ may be considered as a width of a protrusion of the flap 103. In order to effectively reduce acoustic resistance, in an embodiment, the width $W_T$ may be chosen such that $W_T \geq 1.5 \times H_{slit}$ or $W_T \geq 1.5 \times U_{Z\_open}$ (but not limited thereto), where $H_{slit}$ represents a height of facing walls between the flaps 101 and 103, typically defined by thickness of the film structure, and $U_{Z\_open}$ represents a displacement difference between free ends of the flaps 101 and 103 on Z direction when the VV 212 is opened. As long as $W_T \geq H_{slit}$ or $W_T \geq U_{Z\_open}$, requirements of the present application are satisfied and would be within the scope of the present application.

Because of the line segment 231 with length $W_T$, the protruded parts of the flap 103 would have a flat top (also denoted as 231) and the depressed part of the flap 101 would have a flat bottom (also denoted as 231). Note that, the flat top of the protruded parts of the flap 101/103 would be beneficial on reducing acoustic resistance (compared to the case of protrusion with sharp tip), and the flat bottom of the flap 101/103 would be beneficial on enhancing an effect of increasing slit length for reducing inter-tooth acoustic resistance (compared to the case of depression with recessed sharp tip). In general, compared to slit with saw-shaped/sinusoidal pattern, for the reason of reducing acoustic resistance, slit may be patterned such that protrusions of the flap 101/103 have plateau (e.g., 231).

Note that, the slit 212 in FIG. 5C comprises nonzero projection onto X direction/dimension, i.e., line segment 232. In comparison, the slit 112 in FIG. 4B is considered to have zero projection onto X direction/dimension, geometrically or in top view perspective. Furthermore, the slit 212 shall be lengthened compared to the slit 112.

When the flaps 101 and 103 are actuated to perform the differential movement, due to the fact that the slit 212 is lengthened and the slit 212 comprises nonzero projection onto X direction/dimension, acoustic impedance and lateral airflow component are significantly reduced. Airflow flows through region between $x_{103L}$ and $x_{101R}$. Furthermore, as can be seen from FIG. 5D, airflow direction may be mostly perpendicular to XY plane, the plane defined by the flap 101 and 103. As a result, the pressure difference $\Delta P$ would be neutralized (when the VV 212 is opened) much faster, compared to the case when the VV 112 is opened.

Figure 7:
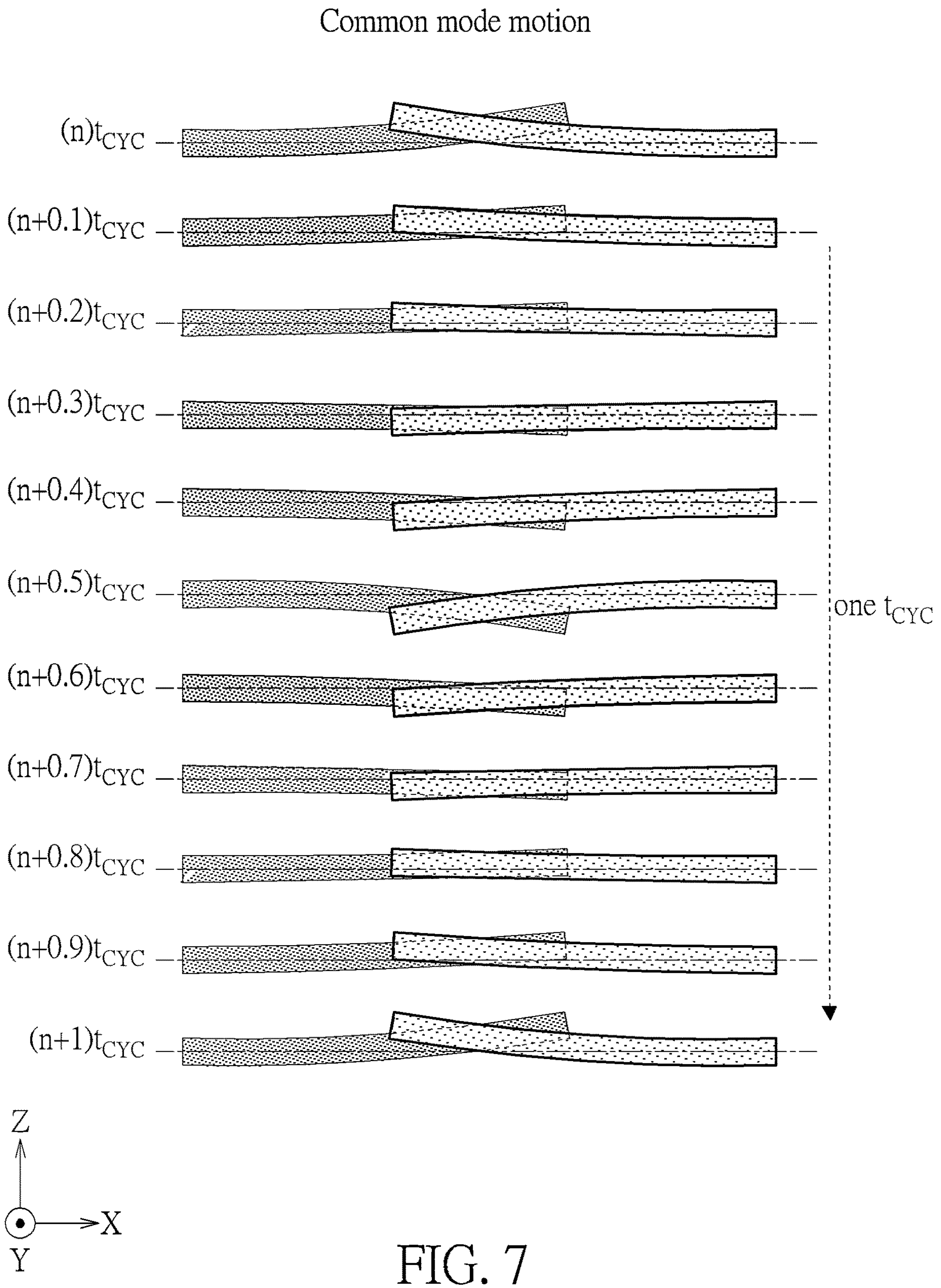
FIG. 7 illustrates a common mode movement of the first flap and the second flap of the APG device of FIG. 5C.
Figure 8:
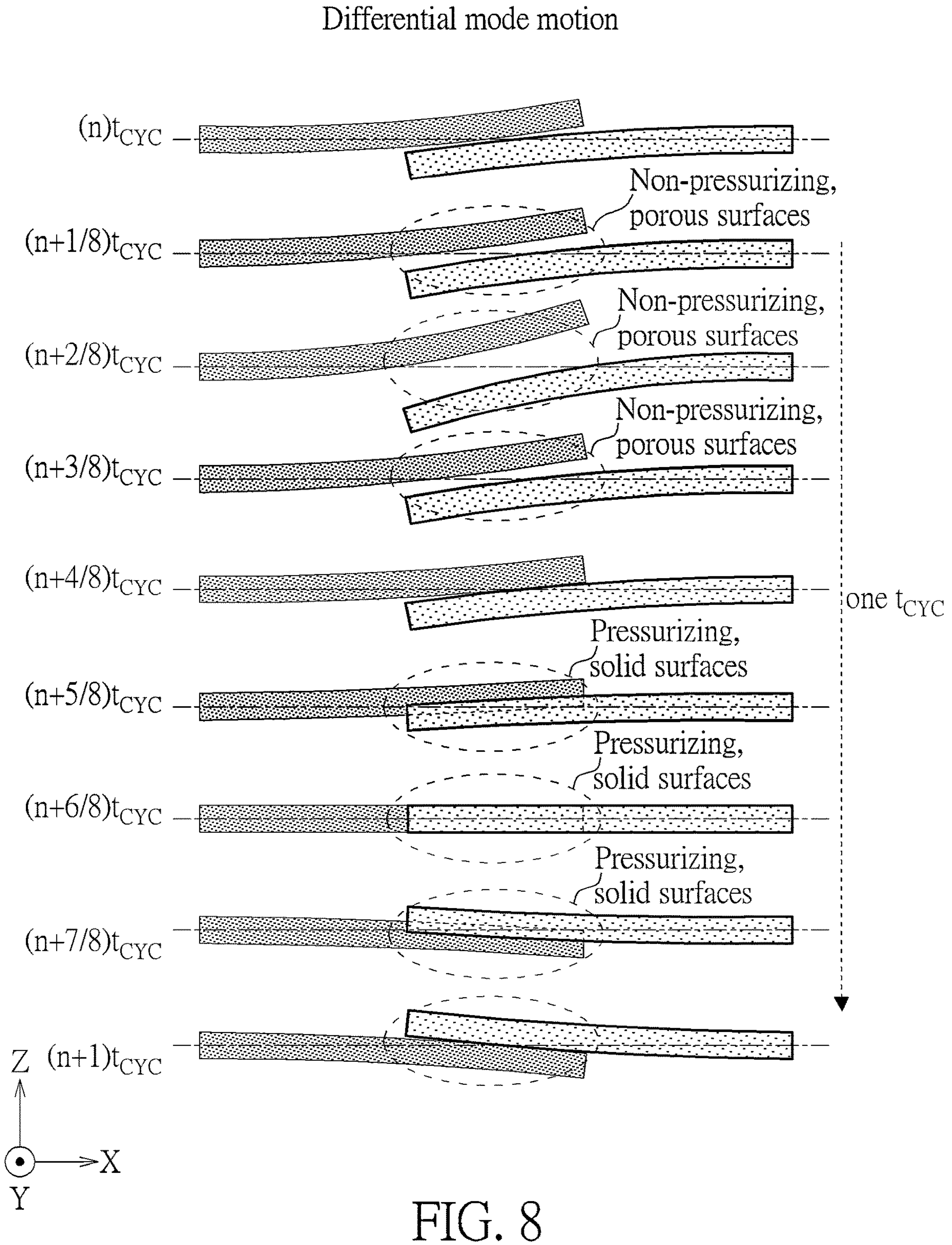
FIG. 8 illustrates a differential mode movement of the first flap and the second flap of the APG device of FIG. 5C.

FIGS. 7 and 8 illustrate time-sequences of common mode displacements and differential mode displacements, respectively, where $t_{CYC}$ denotes cycle time. In an embodiment, $t_{CYC}=1/f_{Pulse}$. These two time-sequences are for illustration only, as they may not exist in isolation (e.g., in time-divisional operation) in practice and will be combined into one movement for flap 101 and another movement for flap 103 through wiring connection schemes shown in FIG. 2. Details may be referred to No. 11,943,585 B2 and references therein, which is incorporated herein by reference.

As depicted in FIG. 8, between time of $(n+1/8)\cdot t_{CYC}$~$(n+3/8)\cdot t_{CYC}$, the VV 212 is considered to be in “opened” state and the area outlined by segments 231-232 are considered as “highly porous”, “acoustically translucent” and “non-pressurizing”, which means the common mode motion of flaps 101 and 103 within this time period of $(n+1/8)\cdot t_{CYC}$~$(n+3/8)\cdot t_{CYC}$ will result in minimal $\Delta P$ and the common mode motion of flaps 101 and 103 are effectively “made vanish”.

Conversely, between time of $(n+5/8)\cdot t_{CYC}$~$(n+7/8)\cdot t_{CYC}$, the VV 212 is considered to be in “closed” state and the area outlined by segments 231-232 are considered as “non-porous”, “acoustically opaque” and “pressurizing”, which means flaps 101 and 103 can be treated as a continuous membrane within this time period of $(n+5/8)\cdot t_{CYC}$~$(n+7/8)\cdot t_{CYC}$, and behave like one (complete membrane) in terms of membrane movement and membrane acceleration.

As can be seen, the VV (e.g., 112 or 212) is in closed state when a difference of displacement of the flap 101 and flap 103 is less than (or equal to) a thickness of the film structure, i.e., $\Delta U_Z \leq H_{slit}$, where $\Delta U_Z = |U_{Z,101} - U_{Z,103}|$, $U_{Z,101/103}$ represent vertical (Z direction/dimension) displacement of the flap 101/103. Note that, in the APG device of the present application, the closed state of the VV occurs at transitions of the differential movement of the flaps 101 and 103. In other words, the VV is closed during a period of the flap 101 moving toward a first direction (e.g., moving downward) and the flap 103 moving toward a second direction opposite to the first direction (e.g., moving upward) such that a displacement difference ($\Delta U_Z$) between free ends of the flaps 101 and 103 is less than a thickness of the film structure $H_{slit}$. In short, when the virtual valve is closed, both flaps are moving.

Figure 9A:
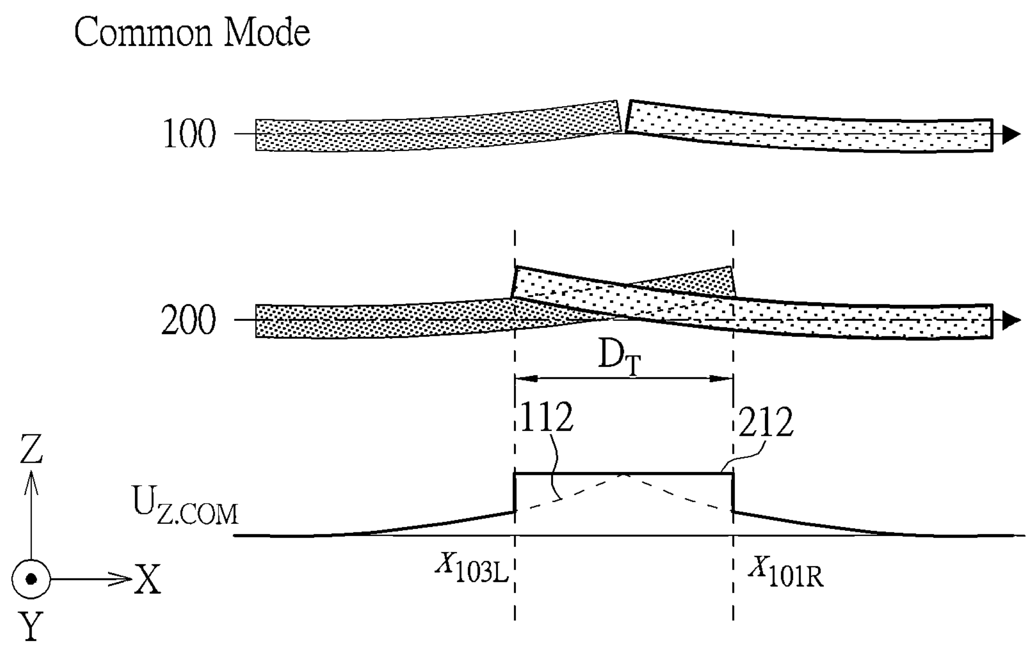
FIG. 9A and FIG. 9B illustrate combined common mode displacement of common mode movement and acoustic conductance of differential mode movement for the APG devices in FIG. 4 and FIG. 5.
Figure 9B:
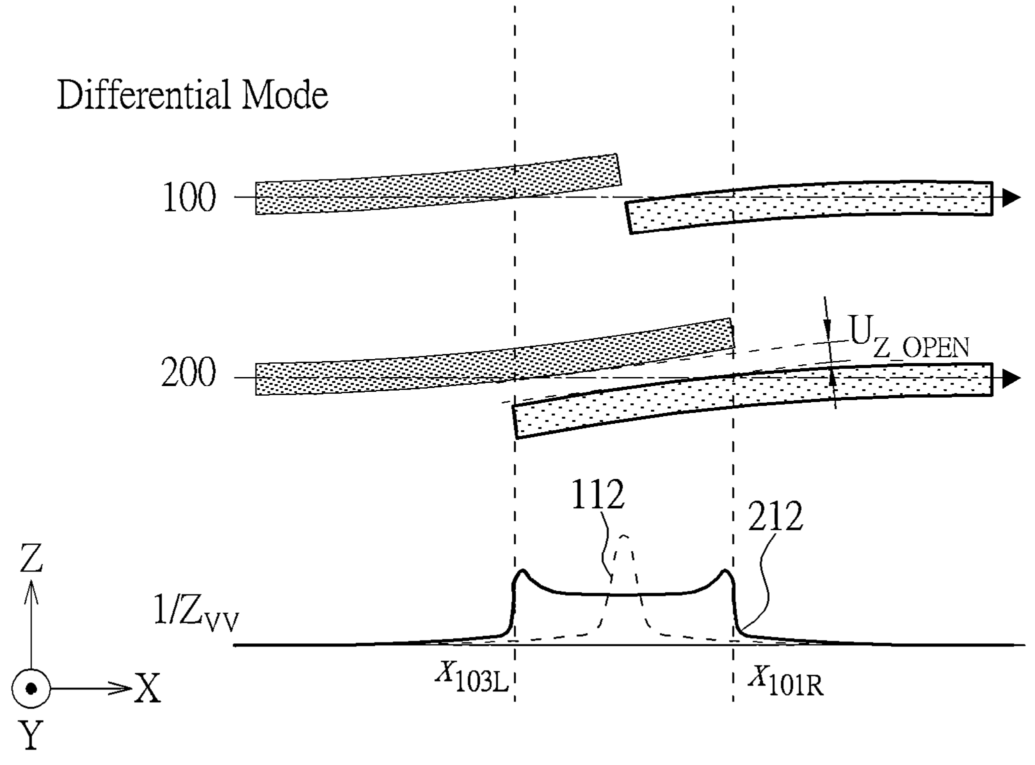

FIG. 9A and FIG. 9B reiterate common mode and differential mode movements, respective, of the APG device 200. In addition, FIG. 9A illustrates a combined common mode displacement $U_{Z.COM}(x)$ with respect to x, variable in X dimension, when both flaps are actuated in common mode, and FIG. 9B illustrates an acoustic conductance $1/Z_{VV}$ with respect to x when both flaps are actuated in differential mode, where $Z_{VV}$ represent an acoustic impedance of VV.

From FIG. 9A, it can be seen that the combined common mode displacement $U_{Z.COM}(x)$ corresponding to VV 212 is evenly distributed over X dimension between $x_{103L}$ and $x_{101R}$, compared to which corresponding to VV 112. From FIG. 9B, it can be seen that the acoustic impedance $Z_{VV}$ is low within the range between $x_{103L}$ and $x_{101R}$, and is mostly evenly distributed over X dimension between $x_{103L}$ and $x_{101R}$. It can be concluded that APG device with zigzagging slit (e.g., slit 212) would be successful in avoiding airflow congestion and minimizing lateral component, and thereby brings asymmetrical air pressure pulses.

Figure 10A:
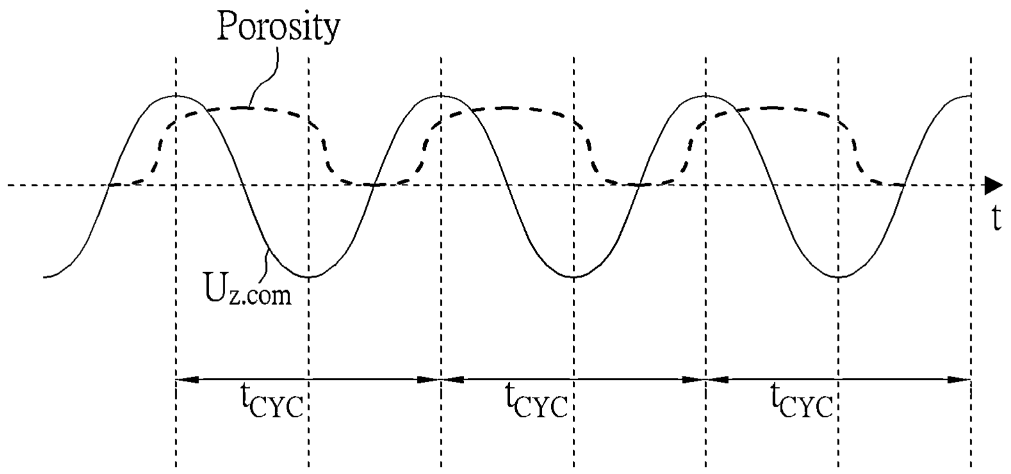
FIG. 10A illustrates a combined common mode displacement versus a porosity of the APG device of FIG. 5C according to an embodiment of the present application.
Figure 10B:
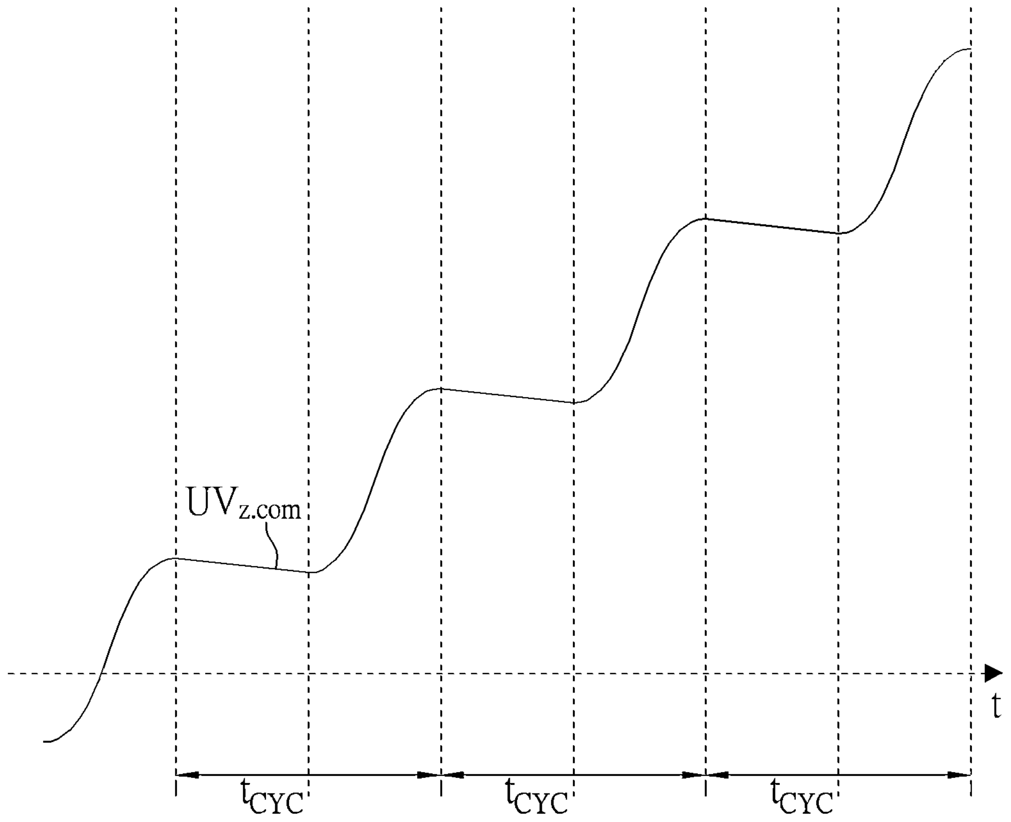
FIG. 10B illustrates a virtual/effective common mode displacement versus a porosity of the APG device of FIG. 5C according to an embodiment of the present application.

In addition, the "made vanish" periods of the VV opened periods (e.g., $(n+1/8)\cdot t_{CYC}\sim(n+3/8)\cdot t_{CYC}$ in FIG. 8) should be properly synchronized and aligned to effective displacement $U_{Z.COM}(t)$, such as shown in FIG. 10A. By taking the "made vanish" periods into consideration, the physical displacement $U_{Z.COM}(t)$ may be converted into or considered as a sequence of virtual/effective movements $UV_{Z.COM}$, as illustrated in FIG. 10B. For sound producing application or APPS (APPS: air pressure pulse speaker) application, such asymmetrical virtual movements $UV_{Z.COM}$ can be utilized to produce asymmetrical pressure pulses, e.g., via chamber compression.

Figure 11:
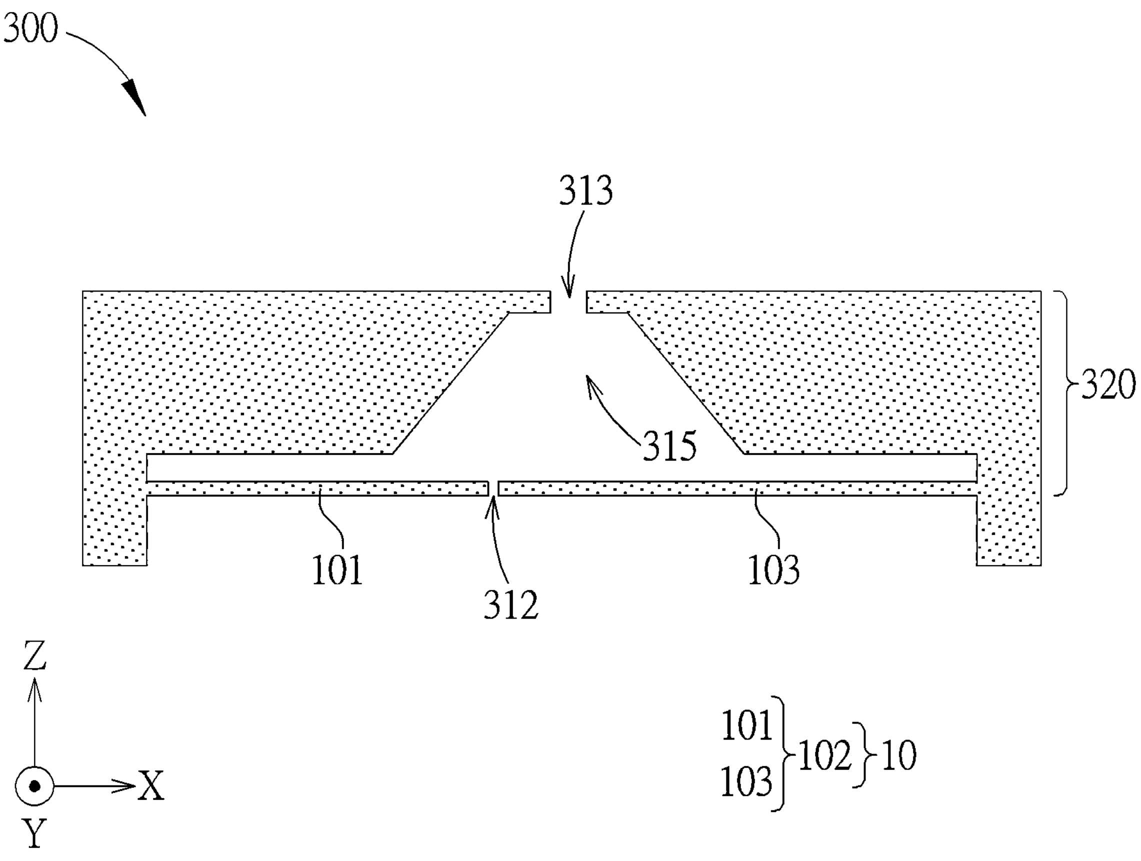
FIG. 11 illustrates an APG device according to an embodiment of the present application.

For example, please refer to FIG. 11, where a schematic diagram of an APG device 300 is illustrated. The APG device 300, comprising a VV 312 (which may be a zigzagging slit, e.g., VV 212), comprises a cap 320, which is employed to form a compression chamber 315. By following the timing diagram of FIG. 10A, a pressure pulse will be created in response to each segment of the asymmetrical "virtual/effective movement" $UV_{Z.COM}(t)$, such as illustrated in FIG. 10B, via chamber compression, which leads to pressure changes at the outlet 313. The pressure changes would in turn lead to acoustic wave propagating outwards, at the sound speed, to the ambience and create a chain of acoustic pressure pulses.

Note that, the pressure pulses are created within the chamber 315 when the VV 312 is in the "closed" state and the magnitude of the pressure pulse is determined by the common mode displacement of the flaps 101, 103 while the VV 312 is in its "closed" state. Conversely, the airflow flowing through the plate of the flaps 101, 103 during time the periods when VV 312/212 is in the "Opened" state will generate rather small ΔP due to broadly-and-evenly distributed airflow (over the VV 312/212), minimal airflow congestion, low acoustic impedance over the VV 312/212, and straight-and-short airflow pathways, and thus will only have minor impact on the net air-pressure-pulse generated by device 300.

Figure 12:
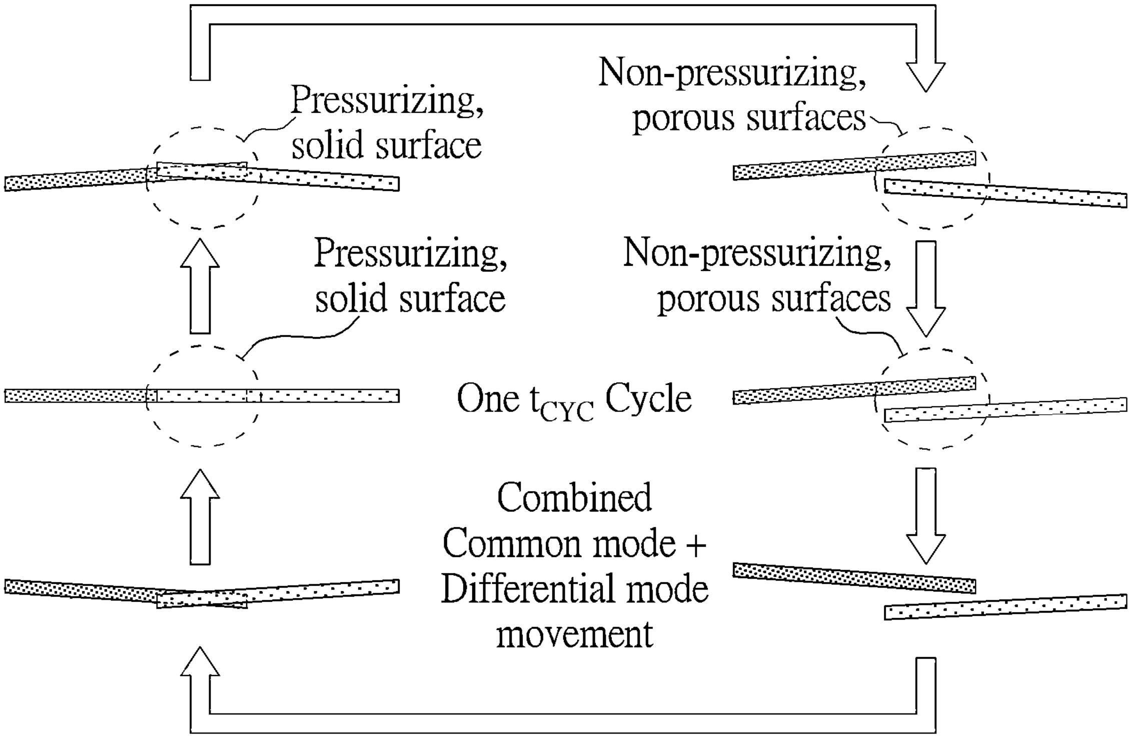
FIG. 12 illustrates common mode movement and differential mode movement of the APG device within one cycle according to an embodiment of the present application.

Refer to FIG. 12, where an alternative view of this common-and-differential mode interaction is illustrated, applicable to (indirect) pressure pulse generation method utilizing a compression chamber. Differential mode motion is represented by a "porosity" value illustrated in FIG. 10A. During time $(n+1/8)\cdot t_{CYC}\sim(n+3/8)\cdot t_{CYC}$ (shown in FIG. 8), VV 212 enters "highly porous" state, and the ΔP created due to common mode motion is largely "leaked through" via the porous surfaces, resulting in zero or near-zero ΔP during time period of $(n+1/8)\cdot t_{CYC}\sim(n+3/8)\cdot t_{CYC}$. Hence, ΔP due to chamber compression is to be dominated by "virtual/effective displacement" occurred during time of $(n+5/8)\cdot t_{CYC}\sim(n+7/8)\cdot t_{CYC}$, as illustrated in FIG. 10B.

Several design metrics, relative to efficacy of bypassing airflow congestion, may be defined. For slit patterning, area coverage ratio (ACR) and displacement coverage ratio (DCR) may be defined as $$ACR = \frac{A(VV)}{A(101+103)} \quad \text{(eq. 1)}$$

$$DCR = \frac{\int_{x_{103L}}^{x_{101R}} U_{Z.COM}\,dx}{\int_{x_{101L}}^{x_{103R}} U_{Z.COM}\,dx}. \quad \text{(eq. 2)}$$

A (VV) in (eq. 1) refers to an area occupied by the slit (e.g., the zigzagging slit 212), and A (101+103) refers to total area of the flaps 101 and 103. Suppose periphery of the film structure is rectangular, ACR can be further expressed as $$ACR = \frac{\int_{x_{103L}}^{x_{101R}} 1\,dx}{\int_{x_{101L}}^{x_{103R}} 1\,dx} = \frac{D_T}{d_{AA}}. \quad \text{(eq. 3)}$$

In the present application, especially (eq. 2) and (eq. 3), $x_{101L}/x_{103L}$ refers to leftmost position on X axis of flap 101/103, and $x_{101R}/x_{103R}$ refers to rightmost position on X axis of flap 101/103. In another perspective, assuming periphery of the film structure is rectangular, $x_{101L}/x_{103R}$ refers to position on X axis where flap 101/103 is anchored, and $x_{103L}/x_{101R}$ is leftmost/rightmost position on X axis of protrusion of flap 103/101.

To bypass airflow congestion effectively, it is suggested that ACR≥0.25 and DCR≥0.5, but not limited thereto.

The pressure pulse generation method mentioned above is referred to indirect method, utilizing the "displacement" of $U_{Z.COM}(t)$ or $UV_{Z.COM}(t)$ to compress a small chamber (e.g., 315), creating pressure pulses and radiating such pressure pulses through a narrow orifice (e.g., 313).

Besides, the air pressure pulses may be generated by direct method. The direct method conceptually utilizes VV (e.g., 112 or 212) to "make vanish" a portion of the "acceleration" of flaps 101, 103, expressed as $d^2U_{Z.COM}(t)/dt^2$, of each pulse cycle $t_{CYC}$, so as to produce a highly asymmetrical "virtual acceleration" of flaps 101, 103, expressed as $d'UV_{Z.COM}(t)/dt^2$.

Figure 13A:
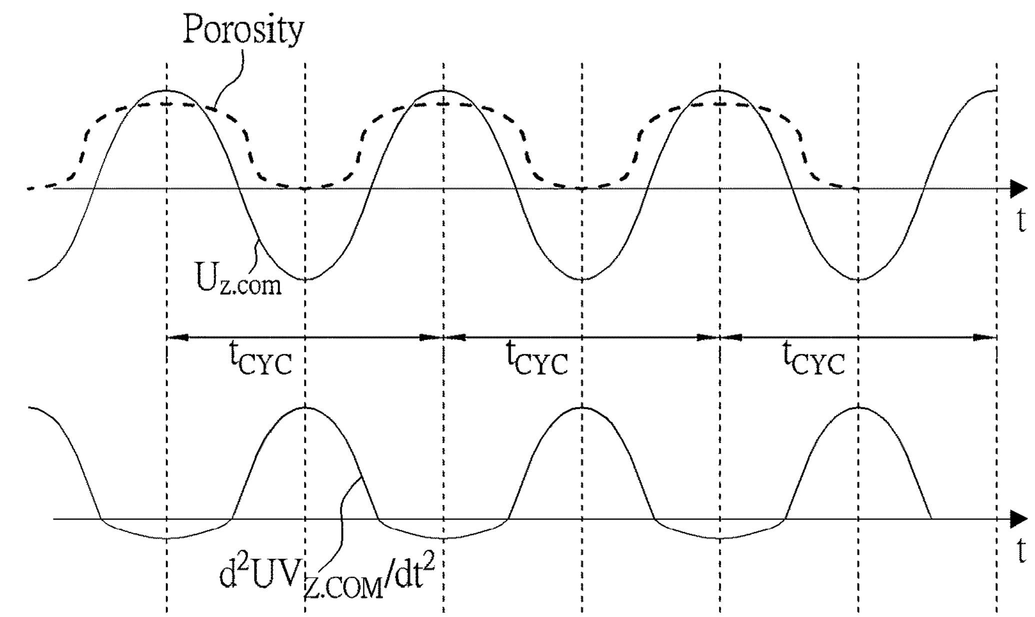
FIG. 13A illustrates a combined common mode displacement and a common mode acceleration versus a porosity of the APG device according to an embodiment of the present application.

In the direct pulse generation method, a pressure pulse will be created in response to each segment of asymmetrical "virtual acceleration" $d'UV_{Z.COM}(t)/dt^2$. For example, as illustrated in FIG. 13A, a pressure pulse will be created in response to a negative half-cycle common mode displacement of $U_{Z.COM}(t)$, which will generate a positive half-cycle acoustic output through positive $d_2UV_{Z.COM}(t)/dt^2$. In this case, air pressure pulses would be generated directly, compared to the indirect method where air pressure pulses are generated via chamber compression, since pressure is related to acceleration and acceleration is double derivative of displacement.

Figure 13B:
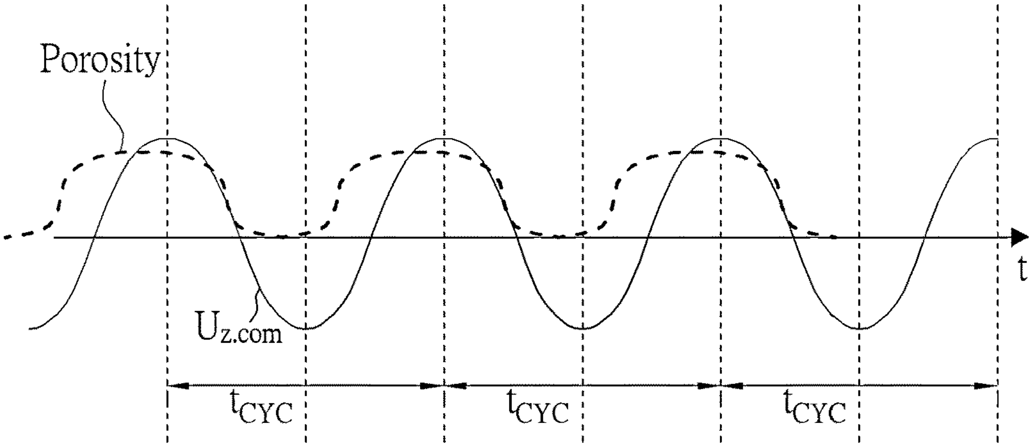
FIG. 13B and FIG. 13C illustrate a combined common mode displacement versus a porosity of the APG device according to an embodiment of the present application.
Figure 13C:
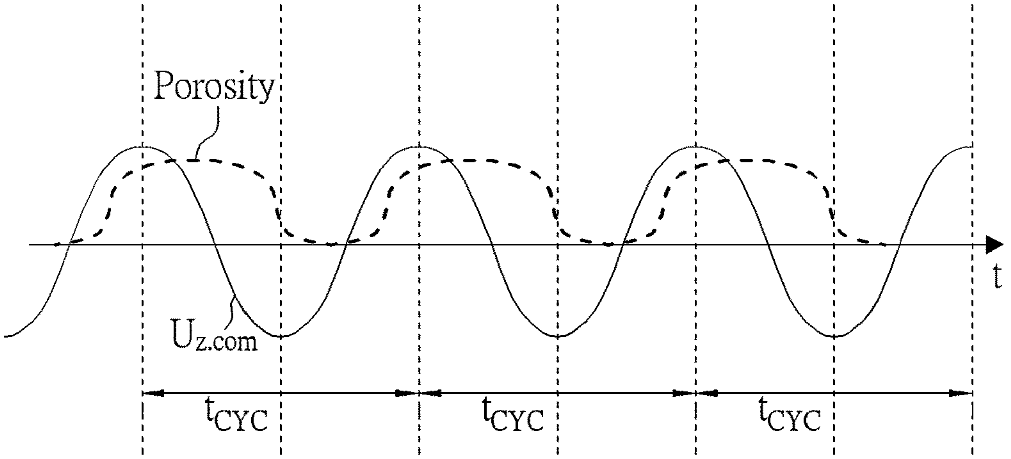

The timing alignment shown in FIG. 13A has a center-to-center alignment between $U_{Z.COM}(t)$ and Open-Close states of VV (e.g., 112 or 212), but not limited thereto. For example, FIG. 13B illustrates a scenario where the Open-Close state timing is pulled "ahead" that of $U_{Z.COM}(t)$ while FIG. 13C illustrates a scenario where the Open-Close state timing is push "behind" that of $U_{Z.COM}(t)$. The optimal timing alignment between $U_{Z.COM}(t)$ and Open-Close states of VV (e.g., 112 or 212) depends on the duty factor of VV or how long VV stays in its "Closed" state. All variations these operating conditions are within the scope of the present invention.

Figure 14:
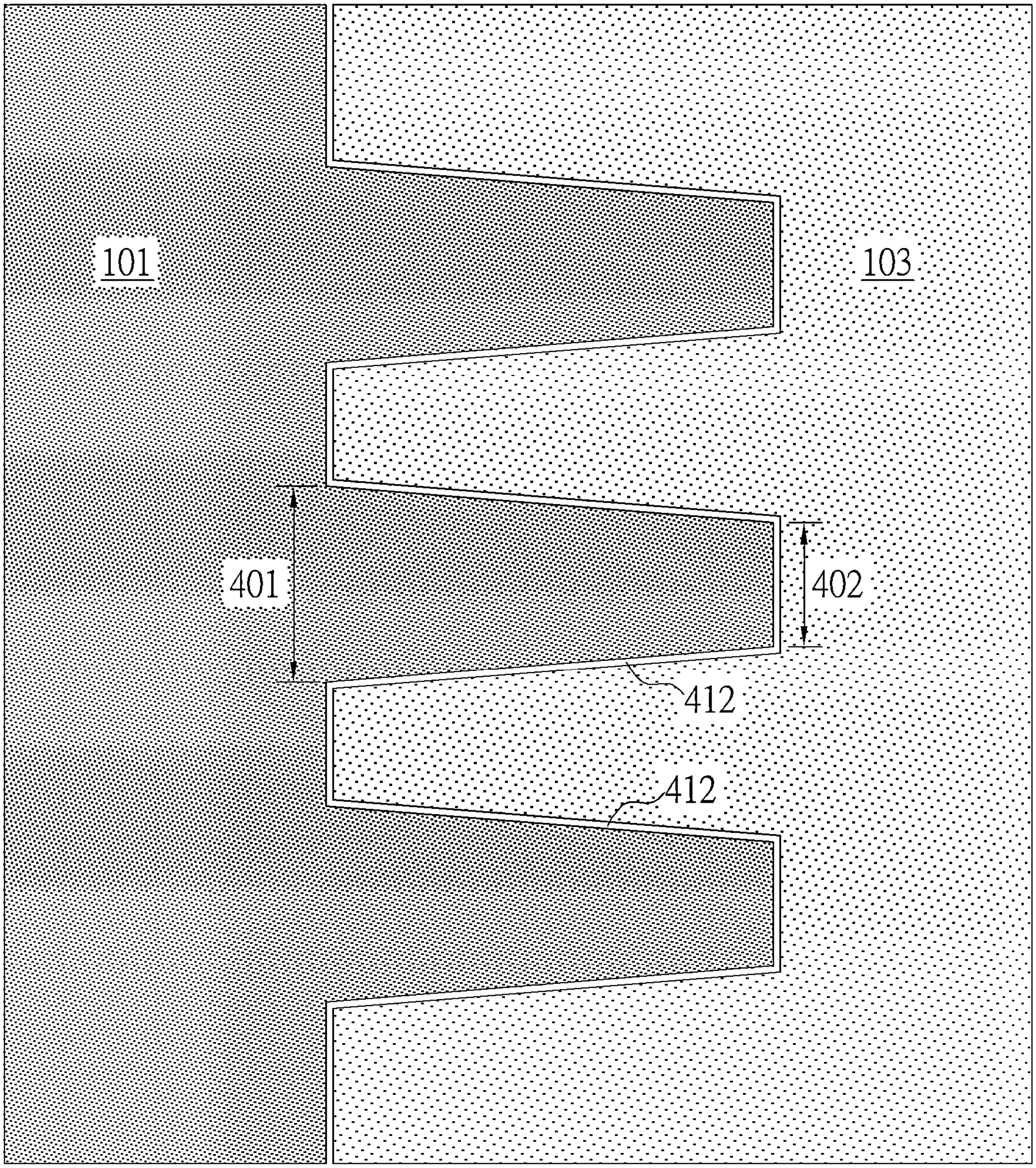
FIG. 14 illustrates an APG device according to an embodiment of the present application.
Figure 15:
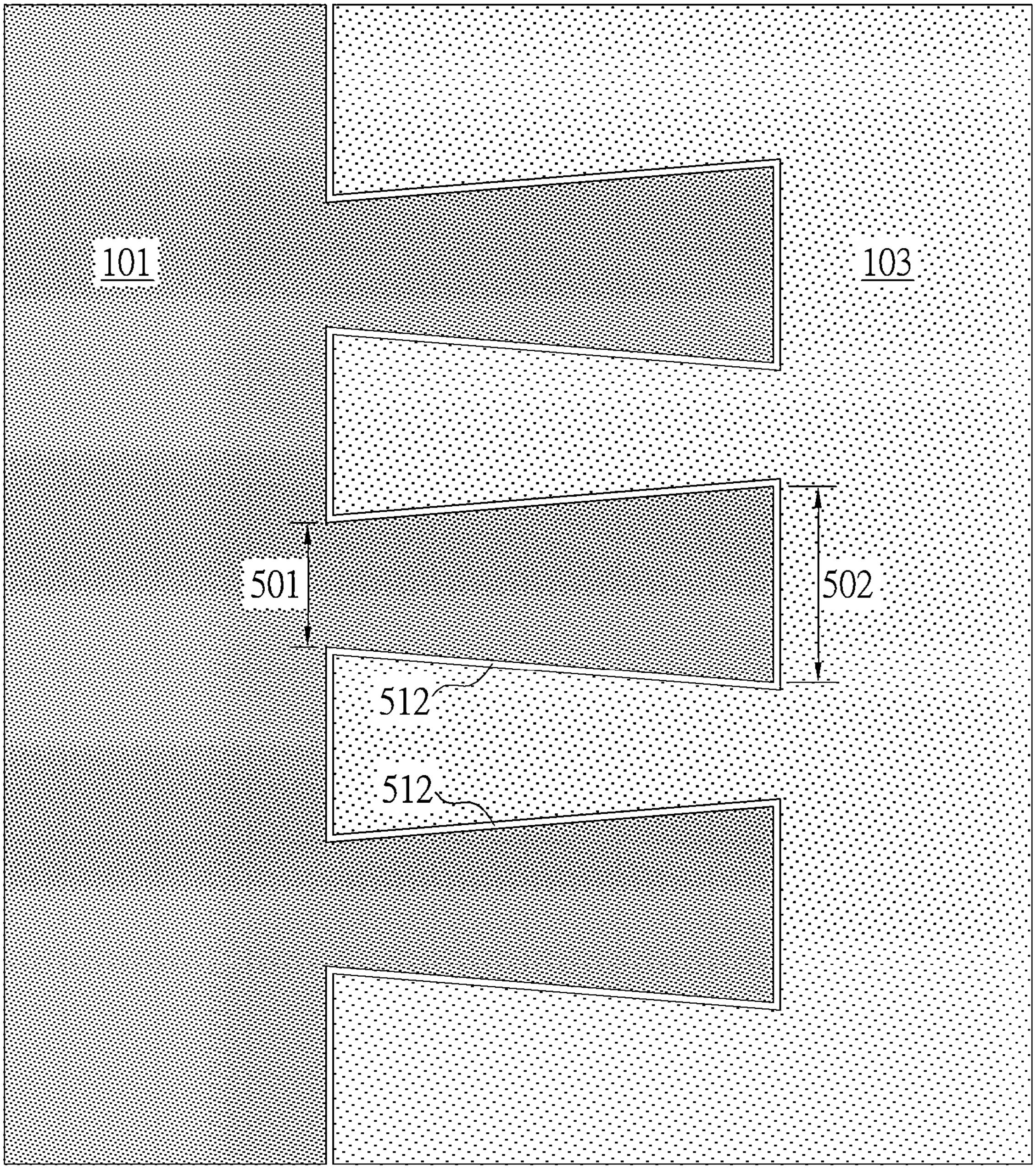
FIG. 15 illustrates an APG device according to an embodiment of the present application.

The zigzagging slit is not limited to being rectangular tooth edge patterned. The zigzagging slit may be trapezoid tooth edge patterned. For example, in FIG. 14 and FIG. 15, slits 412 and 512 are trapezoid tooth edge patterned. Protrusions of flap 101 in FIG. 14 have wider bottom (e.g., 401) than top (e.g., 402); while protrusions of flap 101 in FIG. 15 have wider top (e.g., 502) than bottom (e.g., 501). Both cases and their variations (e.g., fillet or chamfer may be formed on the corner of the protrusions of rectangular/trapezoid patterned slit) are within the scope of the present invention.

Note that, the APG device of the present invention may be applied in sound producing application as an APPS (APPS: air pressure pulse speaker), where the generated plurality of air pulses [is] are amplitude modulated, and an envelope of the plurality of air pulses (or an input signal $S_{IN}$ according to which the modulation signal SM is generated, see FIG. 3) is or comprises an AC (AC: alternating current) component, which may, e.g., result in AC airflow. The input signal $S_{IN}$ may be or comprise an audio signal. The APG/APPS of the present invention may be disposed within, or applied in, a wearable sound device, such as earbud, earphone, TWS (TWS: true wireless stereo), headphone, hearing aid, etc. The APG/APPS of the present invention may also function as loudspeaker or open field speaker, which can be disposed within in OWS (OWS: open wearable stereo), phones (as receiver or speaker), tablets, laptops, desktop (gaming/recording) monitors, televisions, or AR/VR (AR: augmented reality, VR: virtual reality) devices, but not limited thereto.

In addition, the APG device of the present invention may be applied in air movement application with functions similar to fan, blower, etc. Envelop of the generated plurality of air pulses (or the input signal $S_{IN}$ according to which the modulation signal SM is generated) is or comprises an DC (DC: direct current) component, which may, e.g., result in DC airflow. The input signal $S_{IN}$ may be or comprise a DC signal. The APG device of the present invention in air movement application may be used for heat dissipation, ventilation, cooling, drying, or air quality sensing, but not limited thereto. APG device in air movement application has been detailed in U.S. application Ser. No. 18/624,105, which are not narrated herein for brevity.

In short, the present invention utilizes the zigzagging slits or the slits with tooth edge to enhance asymmetry of air pulses, and hence improve performance of the APG devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An air-pulse generating device, comprising:
a film structure, comprising a first flap and a second flap opposite to each other;
wherein the film structure is actuated to operate at an ultrasonic frequency, and the air-pulse generating device produces a plurality of air pulses at an ultrasonic pulse rate;
wherein the first flap and the second flap are actuated to perform a differential movement to form an opening or a virtual valve;
wherein a slit is formed between the first flap and the second flap, and the opening or the virtual valve is formed because of the slit;
wherein the slit is formed as a zigzagging pattern on the film structure;
wherein the slit zigzags in a back-and-forth manner among a first direction and extends toward a second direction.

2. The air-pulse generating device of claim 1,
wherein the slit comprises nonzero projection onto the first direction.

3. The air-pulse generating device of claim 1,
wherein the first flap comprises a plurality first protrusions and the second flap comprises a plurality second protrusions;
wherein the first protrusions and the second protrusions are interleaved with each other.

4. The air-pulse generating device of claim 3,
wherein the first flap comprises a plurality first depressions and the second flap comprises a plurality second depressions;
wherein the first protrusions and the first depressions are interleaved with each other.

5. The air-pulse generating device of claim 1,
wherein the first flap comprises a plurality first protrusions;
wherein a protrusion among the first protrusions comprises a plateau portion.

6. The air-pulse generating device of claim 1,
wherein the first flap comprises a plurality first protrusions;
wherein a protrusion among the first protrusions corresponds to a width;
wherein the width is greater than a height of walls between the first flap and the second flap.

7. The air-pulse generating device of claim 1,
wherein the first flap comprises a plurality first protrusions;
wherein a protrusion among the first protrusions corresponds to a width;
wherein the width is greater than a displacement difference between free ends of the first flap and the second flap when the virtual valve is opened.

8. The air-pulse generating device of claim 1, wherein the first flap comprises a plurality first protrusions;

wherein a protrusion among the first protrusions corresponds to a depth;

wherein the depth is greater than 15% of an anchor-to-anchor distance.

9. The air-pulse generating device of claim 1, wherein the slit forms a tooth edge pattern.

10. The air-pulse generating device of claim 1, wherein the slit forms a rectangular tooth edge pattern.

11. The air-pulse generating device of claim 1, wherein the slit forms a trapezoid tooth edge pattern.

12. The air-pulse generating device of claim 1, wherein the film structure is actuated to perform a common mode movement to form an amplitude-modulated ultrasonic air pressure variation with an ultrasonic frequency.

13. The air-pulse generating device of claim 12, wherein the first flap and the second flap are actuated to perform the common mode movement and the differential movement simultaneously.

14. The air-pulse generating device of claim 1, wherein the first flap and the second flap are actuated to perform the differential movement, so as to form the opening at an ultrasonic opening rate.

15. The air-pulse generating device of claim 1, wherein the virtual valve is in a closed state when a difference of displacement of the first and second flaps is less than a thickness of the film structure;

wherein the closed state of the virtual valve occurs at transitions of the differential movement of the first flap and the second flap.

16. The air-pulse generating device of claim 1, wherein the slit zigzags on the film structure such that an area coverage ratio is no smaller than 0.25.

17. The air-pulse generating device of claim 1, wherein the slit zigzags on the film structure such that a displacement coverage ratio is no smaller than 0.5.

18. The air-pulse generating device of claim 1, wherein the first and second flaps form a flap pair;

wherein a time of the virtual valve being closed is aligned to a time corresponding to a common mode movement of the flap pair toward a third direction;

wherein a time of the virtual valve being opened is aligned to a time corresponding to the common mode movement of the flap pair toward a fourth direction opposite to the third direction.

19. The air-pulse generating device of claim 1, comprising:

a covering structure;

wherein a chamber is formed between the film structure and the covering structure.

20. The air-pulse generating device of claim 19, wherein an orifice is formed on the covering structure;

wherein the plurality of air pulse propagates outward via the orifice.

21. The air-pulse generating device of claim 1, wherein the first and second flaps form a flap pair;

wherein a time of the virtual valve being closed is aligned to a time corresponding to a peak acceleration of a common mode movement of the flap pair.

22. The air-pulse generating device of claim 1, wherein a combined common mode displacement corresponding to the virtual valve is evenly distributed within a range between a rightmost free end of the first flap and a leftmost free end of the second flap.

23. The air-pulse generating device of claim 1, wherein an acoustic impedance corresponding to the virtual valve is evenly distributed within a range between a leftmost free end of the second flap and a rightmost free end of the first flap.

24. The air-pulse generating device of claim 1, wherein the air-pulse generating device is applied in a sound producing application.

25. The air-pulse generating device of claim 1, wherein the air-pulse generating device is applied in an air movement application.

* * * * *